(12) United States Patent
Christopoulos

(10) Patent No.: US 8,770,182 B2
(45) Date of Patent: Jul. 8, 2014

(54) ROTISSERIE BARBECUE GRILL

(76) Inventor: James Christopoulos, Chicago, IL (US)

( * ) Notice: Subject to any disclaimer, the term of this patent is extended or adjusted under 35 U.S.C. 154(b) by 0 days.

(21) Appl. No.: 13/613,990

(22) Filed: Sep. 13, 2012

(65) Prior Publication Data

US 2013/0000629 A1  Jan. 3, 2013

(51) Int. Cl.
*F24B 3/00* (2006.01)
*A47J 37/07* (2006.01)
*A47J 37/04* (2006.01)

(52) U.S. Cl.
CPC ............ *A47J 37/041* (2013.01); *A47J 37/0704* (2013.01); *A47J 37/0786* (2013.01); *A47J 37/0745* (2013.01)
USPC .............. 126/65; 126/1 R; 126/25 R; 126/29; 126/30; 126/9 A; 72/379.2; 72/379.6

(58) Field of Classification Search
USPC ................ 126/1 R, 58, 65, 25 R, 29, 30, 9 A; 72/379.2, 379.6
See application file for complete search history.

(56) References Cited

U.S. PATENT DOCUMENTS

| | | | | |
|---|---|---|---|---|
| 1,732,910 A | * | 10/1929 | Possons | 99/425 |
| 1,785,986 A | * | 12/1930 | Speer et al. | 29/17.4 |
| 2,943,557 A | * | 7/1960 | Suehlsen | 99/421 R |
| 3,247,827 A | * | 4/1966 | Cremer | 126/25 R |
| 3,264,790 A | * | 8/1966 | Beals | 52/14 |
| 3,296,957 A | | 1/1967 | Gagnon et al. | |
| 3,394,648 A | * | 7/1968 | Kring | 99/340 |
| 3,669,340 A | * | 6/1972 | Kinney | 229/170 |
| 3,802,853 A | * | 4/1974 | O'Connor | 428/595 |
| 3,943,837 A | | 3/1976 | Trkla | |
| 3,974,760 A | * | 8/1976 | Ellis | 99/482 |
| 4,108,055 A | * | 8/1978 | Simmons | 99/421 H |
| 4,223,619 A | * | 9/1980 | Hare | 228/196 |
| 4,323,005 A | * | 4/1982 | Sconyers | 99/400 |
| 4,442,762 A | | 4/1984 | Beller | |
| 4,442,763 A | * | 4/1984 | Beller | 99/427 |
| 4,574,770 A | | 3/1986 | Wells | |
| 4,599,938 A | | 7/1986 | Gongwer | |
| 4,619,190 A | * | 10/1986 | Smith | 99/393 |
| 4,773,319 A | | 9/1988 | Holland | |
| 4,909,137 A | | 3/1990 | Brugnoli | |
| 4,936,202 A | | 6/1990 | Lin | |
| 5,129,385 A | * | 7/1992 | Dodgen | 126/25 R |
| 5,158,066 A | | 10/1992 | Dodgen | 126/25 R |
| 5,456,163 A | * | 10/1995 | Ceravolo | 99/446 |
| 5,515,774 A | * | 5/1996 | Swisher et al. | 99/340 |
| 5,524,610 A | * | 6/1996 | Clark | 126/682 |
| 5,529,798 A | * | 6/1996 | Clark et al. | 426/523 |
| 5,722,388 A | * | 3/1998 | Butow et al. | 126/25 R |
| 5,752,433 A | | 5/1998 | Charlson et al. | |
| 5,890,422 A | * | 4/1999 | Clark et al. | 99/447 |

(Continued)

OTHER PUBLICATIONS

Kanes Kamp Kitchen, Advertisement, Newspaper title: Orthodox Observer, Jan. 2012, p. 16, Greek Orthodox Observer, New York, NY.

*Primary Examiner* — Kenneth Rinehart
*Assistant Examiner* — Jorge Pereiro
(74) *Attorney, Agent, or Firm* — The John Marshall Law School Patent Clinic

(57) ABSTRACT

A unitary barbecue heat source bed and fluid removal channel combination, comprising a plurality of heat source beds, an inclined channel for removing fluid, the heat source beds being adjacent to the channel, wherein the heat source beds and channel are unitary and preferably made from a single sheet of metal.

16 Claims, 7 Drawing Sheets

(56) References Cited

U.S. PATENT DOCUMENTS

| | | | | |
|---|---|---|---|---|
| 5,899,842 | A * | 5/1999 | Di Pilla | 493/405 |
| 5,911,812 | A | 6/1999 | Stanek et al. | |
| 6,073,543 | A * | 6/2000 | Golfi | 99/397 |
| 6,237,472 | B1 | 5/2001 | Gates | |
| 6,247,468 | B1 | 6/2001 | Wood | |
| 6,463,924 | B1 | 10/2002 | Osterman | |
| 6,523,575 | B1 * | 2/2003 | Mrsny | 138/109 |
| 6,607,805 | B1 | 8/2003 | Clark | |
| 6,609,512 | B2 * | 8/2003 | Poe et al. | 126/25 A |
| 6,640,605 | B2 * | 11/2003 | Gitlin et al. | 72/379.2 |
| 6,688,059 | B1 * | 2/2004 | Walker | 52/302.3 |
| 6,869,629 | B2 * | 3/2005 | Tiernan | 426/243 |
| 6,883,514 | B1 | 4/2005 | Felicitas et al. | |
| 6,966,253 | B2 * | 11/2005 | Witzel | 99/400 |
| 7,104,020 | B1 * | 9/2006 | Suttle | 52/551 |
| 7,296,455 | B2 * | 11/2007 | Durney | 72/306 |
| 2002/0179080 | A1 * | 12/2002 | Poe et al. | 126/25 A |
| 2002/0184936 | A1 * | 12/2002 | Gitlin et al. | 72/379.2 |
| 2003/0005920 | A1 * | 1/2003 | Poe et al. | 126/25 A |
| 2004/0250809 | A1 | 12/2004 | Wolf | |
| 2006/0053857 | A1 * | 3/2006 | Durney | 72/319 |
| 2007/0006867 | A1 * | 1/2007 | Karney et al. | 126/37 B |
| 2007/0221202 | A1 | 9/2007 | Bruno et al. | |
| 2008/0121221 | A1 | 5/2008 | Wang et al. | |
| 2009/0032009 | A1 | 2/2009 | Lai et al. | |
| 2010/0260910 | A1 | 10/2010 | Backus et al. | |

* cited by examiner

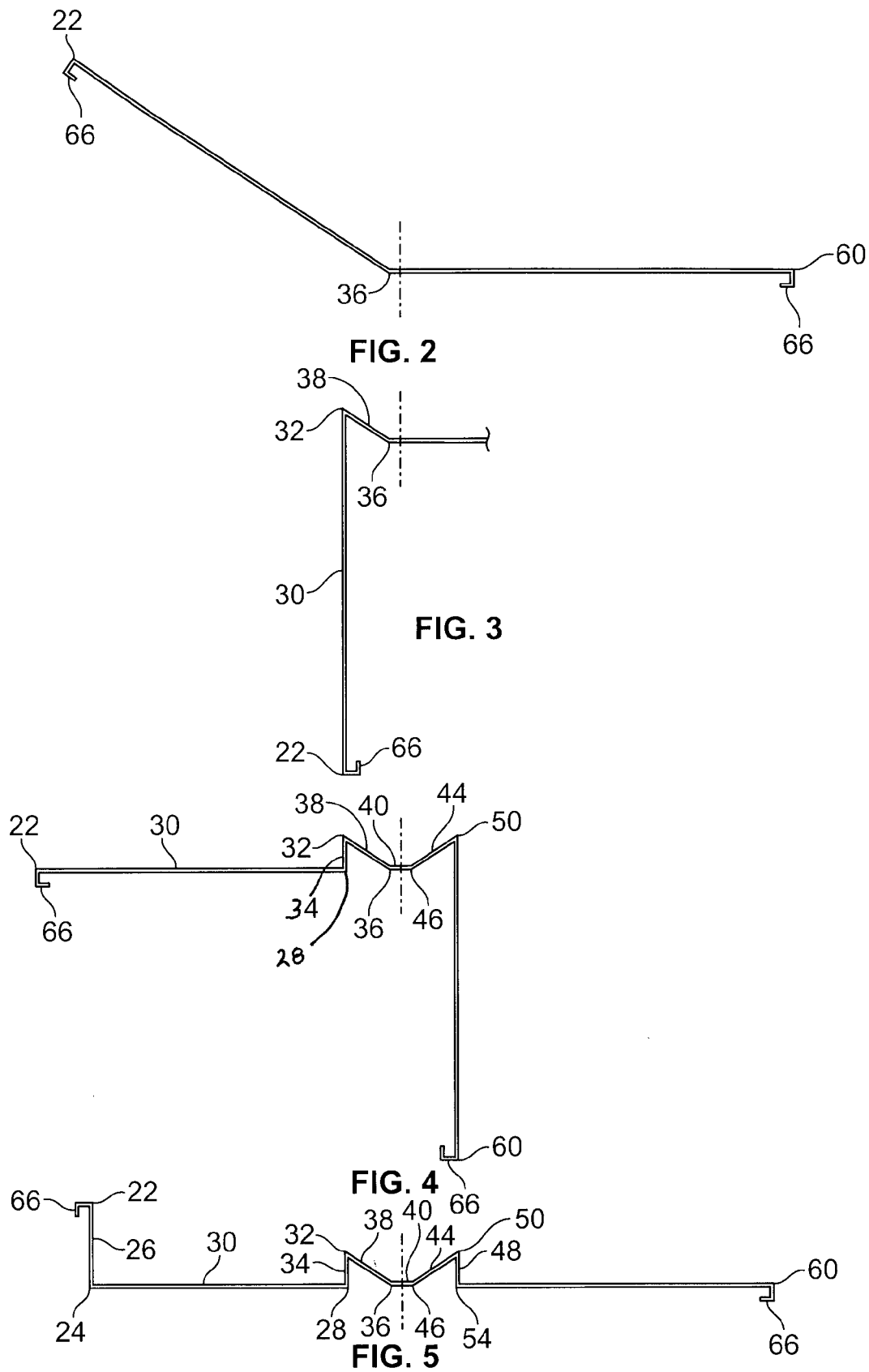

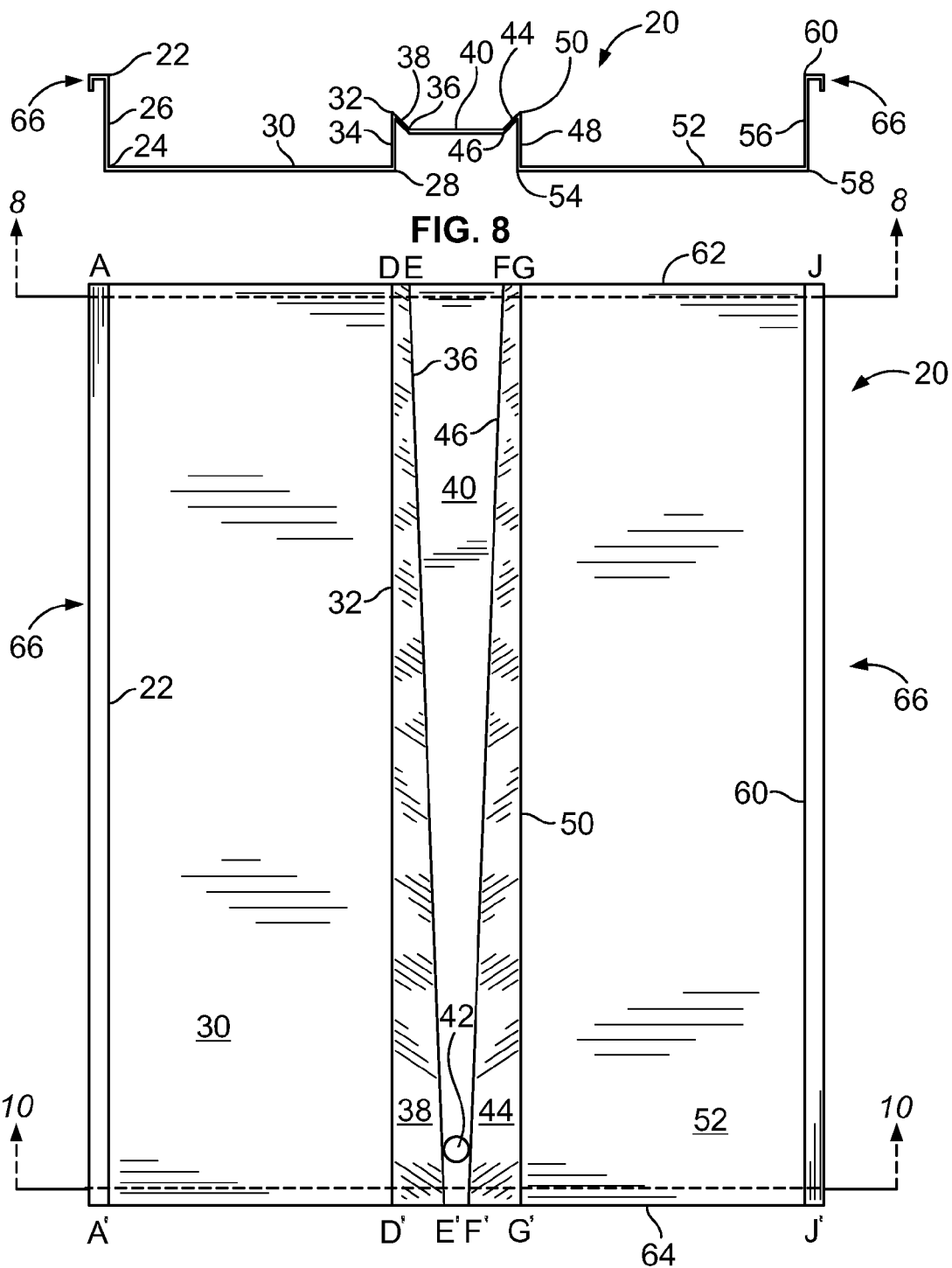
FIG. 8
FIG. 9
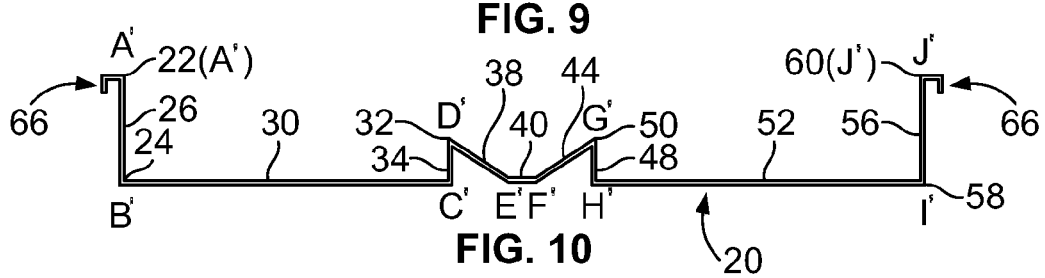
FIG. 10

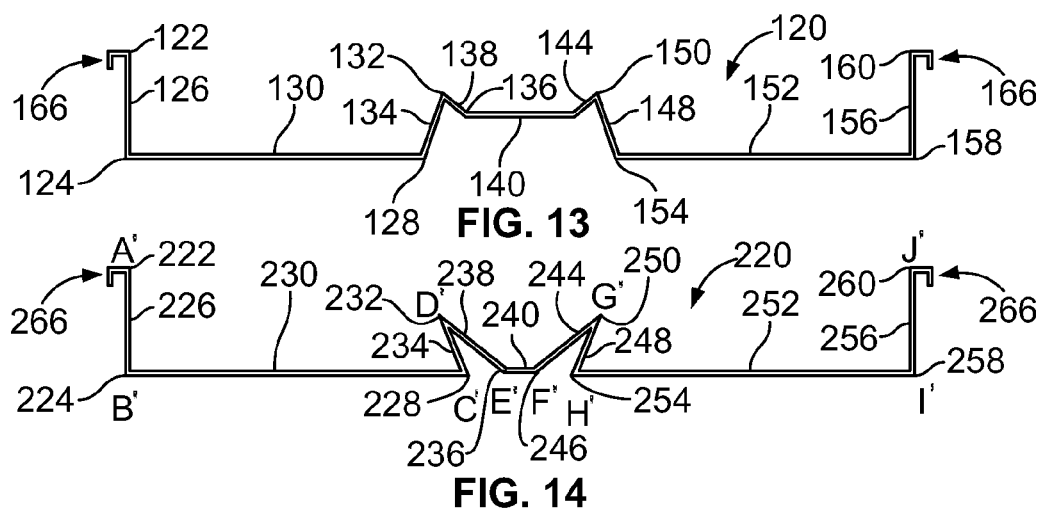
FIG. 13
FIG. 14
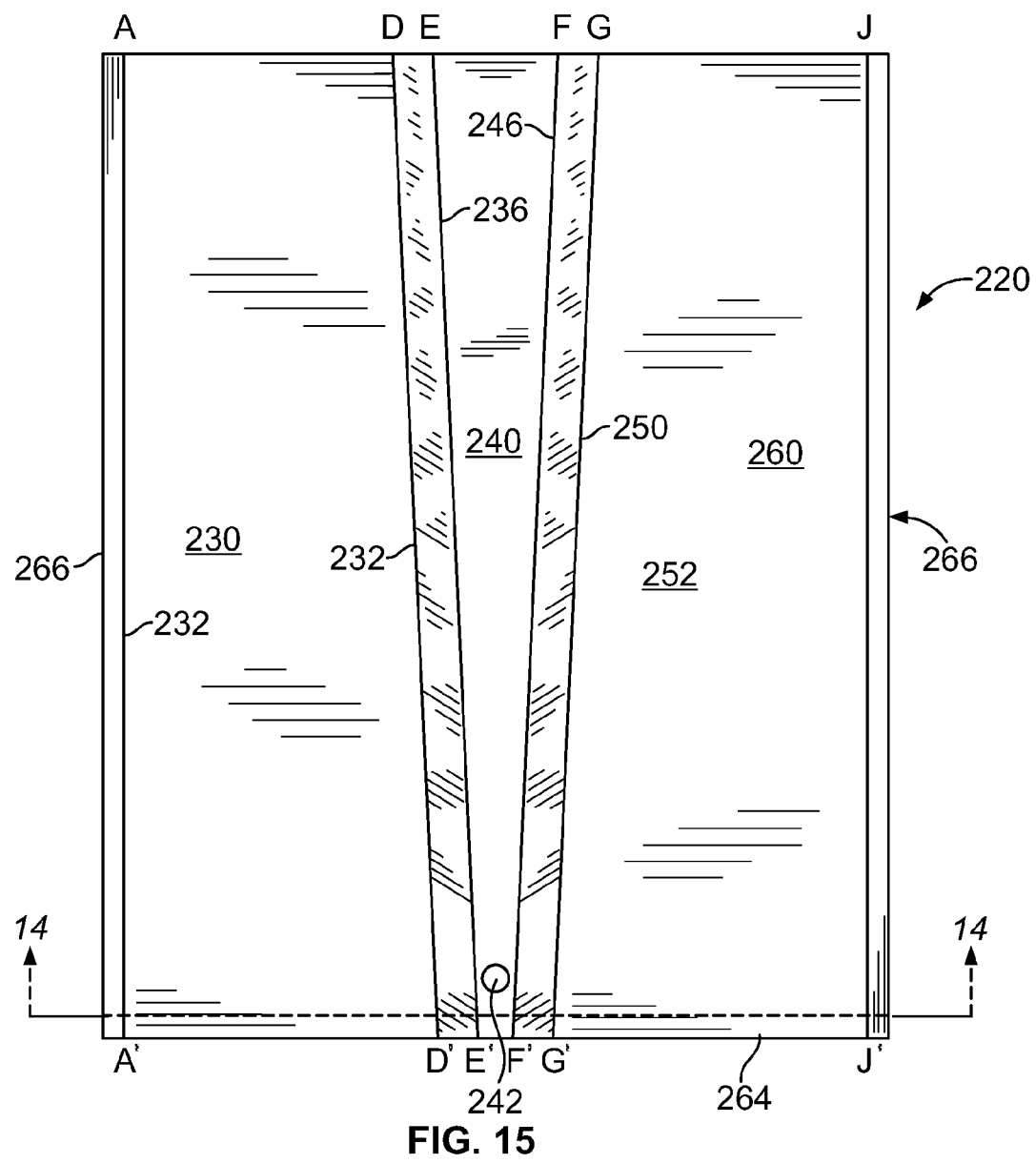
FIG. 15

ROTISSERIE BARBECUE GRILL

BACKGROUND OF THE INVENTION

1. Field of the Invention

This invention relates generally to rotisseries for cooking meat, and more particularly rotisserie grill used for cooking of a whole animal carcass adjacent a source of heat.

2. Background Art

Rotisserie barbecue grills involve roasting a whole animal carcass, usually over the heat source. During the roasting process, grease and fluids are released from the animal carcass. As these make contact with the heat source, the result is the heat source flame can flare-up and present a danger to those adjacent the rotisserie grill. Prior art attempts have been proposed that are directed to prevent flame flare-ups by the use of grease catching devices between the meat and the heat source.

One prior art design disposes a grease dripping tray between the heat source and the animal carcass to collect grease drippings. These types of designs are not ideal because the tray is heated by the heat source from the heat source below and allows for flare-ups to occur when the tray becomes heated enough. In addition, the use of a drip tray between the heat source and the cooking meat acts to reflect some of the radiant heat and creates convective flow patterns that impede cooking. Other prior art designs fail to include a means for draining grease from the tray.

Another approach, shown and described in U.S. Pat. No. 4,773,319 to Holland, proposes a means for collecting grease in a large tray that is nearly as large as the cooking surface. One embodiment shown and described therein shows the grease collection pan as having nearly the same size in terms of surface area as the heat source, which reduces and essentially diminishes any radiant heat from reaching the cooking meat to a bare minimum. These designs are deficient for use in whole animal rotisserie cooking because they deflect and block the radiant heat from reaching the animal carcass. Other inventions use pans of varying sizes. In most of these designs, the general result is an obstruction of the radiant heat emanating from the heat source toward the cooking meat. It is preferable to have minimal obstructions between the heat source and the meat being cooked so that the radiant heat is unobstructed.

Advancing on this approach, there are rotisseries that propose to dispose staggered grease dripping catches, as seen in U.S. Pat. No. 4,574,770 to Wells. Wells teaches staggered grease dripping catches with a shield below them to prevent the heating of the grease and possible flare-ups. While this invention may minimize heat deflection and effectively catch the grease drippings, it is complex in construction and assembly, and does not lend itself readily to grill construction for the non-commercial consumer.

Still other approaches, such as those taught by Wang in US Published Pat. Appln. No. 2008/0121221 and by Felecitas in U.S. Pat. No. 6,883,514, both have heat sources that are disposed off to the sides and laterally from the cooking meat. Both inventions allow grease to drip between and below the heat sources but are deficient due to the heat source being limited to the outer extremes of the devices and not providing uniform radiant heat.

A need remains for a rotisserie barbecue grill that minimizes flare-ups while disposing of grease drippings with minimal obstructions to the radiant heat. Preferably, such a construction utilizes all the surface area of the grill body and is designed for efficient, and easy, construction. There is also a need to construct such a grill in a simple and most efficient way possible in order to reduce costs. To provide these benefits, what is described and claimed herein is the invention addressing these and other problems encountered in the prior art.

SUMMARY OF THE INVENTION

The invention is a grill comprising a single unitary combination barbecue heat source bed and fluid removal channel. It is an improvement upon existing grills and whole animal roasting and rotisserie beds. The invention includes a metal device for roasting food and the method of making the device. The device has at least two heat source beds (such as charcoal barbecue coals) and an inclined channel that is slightly raised adjacent to the heat source beds disposed in a position to catch grease and fluid drippings. The device is unitary and made from a single rectangular sheet of metal bent into the appropriate shape. The finished product is rectangular and can fit into a rectangularly shaped housing.

The present invention provides for several benefits and distinct advantages over the prior art machines and includes a unitary body comprising an integral construction for easy cleaning, strength, reduced manufacturing costs, ease of construction, and that it inhibits grease dripping onto the heat source and reduces the risk of catching fire. The inclined fluid removal channel, being above the heat source beds and separated laterally therefrom prevents the heat or fuel from getting under the inclined channel and thereby heating the grease so as to prevent flame or inductive heating from causing flare-ups. The heat source beds allow for radiant heat to effectively heat the entire animal without hindrance or obstruction and eliminate the need of heat deflectors and directional housings, further reducing material and manufacturing costs and allowing for maximum exposure to the radiant heat source. The invention is easily cleaned. The fluid removal channel can be washed with a water hose and can drain through a drainage hole disposed at a lower end of the inclined channel.

BRIEF DESCRIPTION OF THE DRAWINGS

The present invention will now be discussed in further detail below with reference to the accompanying figures in which:

FIG. 2 is a cross sectional view, after the first bend is made according to the inventive method;

FIG. 3 is a cross sectional view, after three bends are made according to the inventive method;

FIG. 4 is a cross sectional view, after five bends are made showing a completed fluid removal channel according to the inventive method;

FIG. 5 is a cross sectional view, after seven bends are made showing a completed fluid removal channel and heat source bed according to the invention;

FIG. 8 is a cross sectional view taken approximately along the longitudinal line 8-8 of the inventive device of FIG. 9 according to the inventive method;

FIG. 9 is a longitudinal view of the fully folded inventive combination fluid removal channel and heat bed device according to the invention;

FIG. 10 is a cross sectional view taken approximately along the longitudinal line 10-10 of the device of FIG. 9 according to the invention;

FIG. 13 is a cross sectional view of the inventive combination a different embodiment of the invention according to the invention;

FIG. 14 is a cross sectional view of a third embodiment of the combination according to the invention; and FIG. 15 is a longitudinal view of the fully folded different embodiment of the invention according to the invention.

DETAILED DESCRIPTION OF THE PREFERRED EMBODIMENTS

Figure 1:
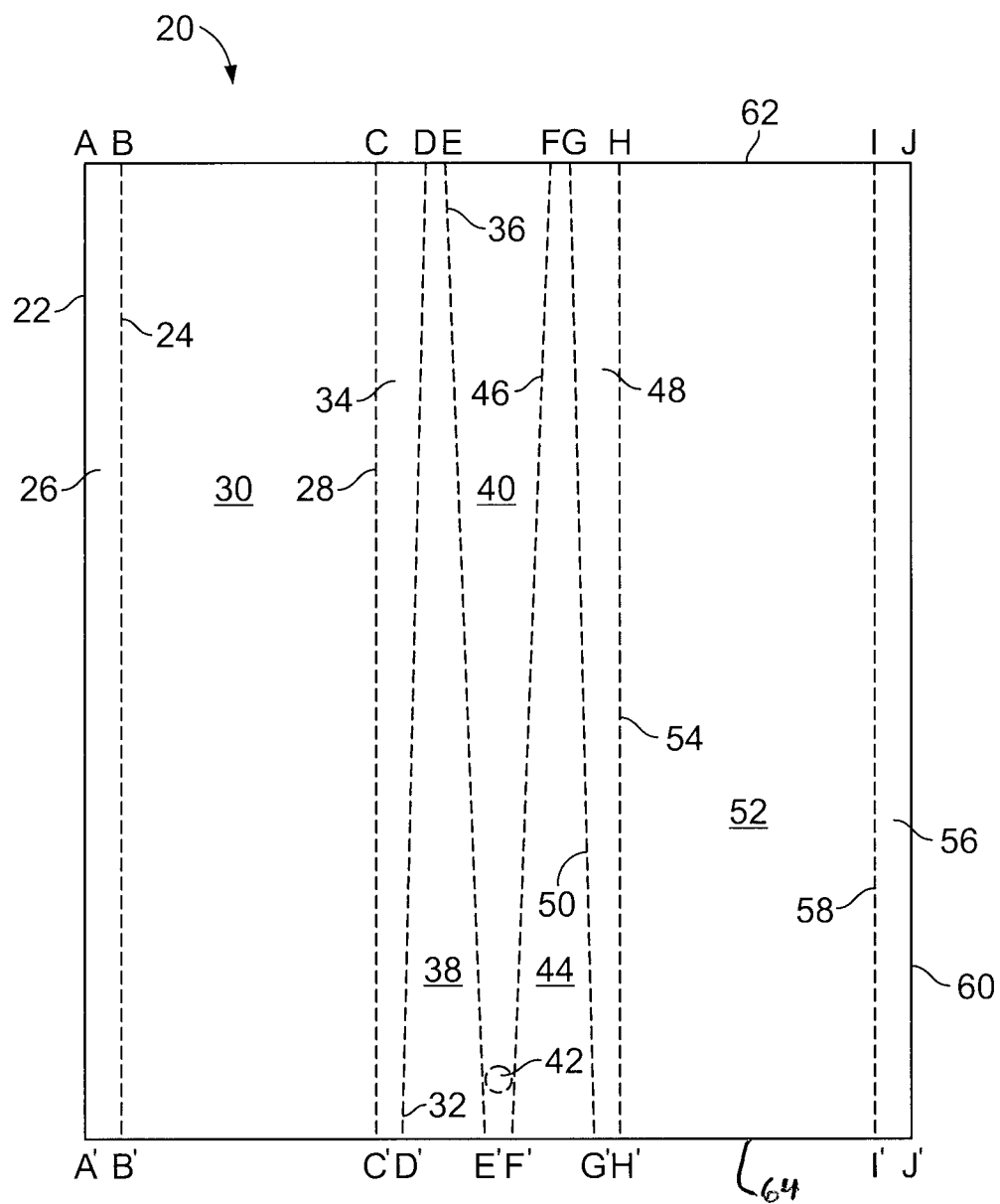
FIG. 1 is a plan view of a sheet of metal to be used in the inventive method, pre bending, showing bend broken lines on exaggerated angles outlined.

FIG. 1 shows a longitudinal view of a blank for forming the combination heat source bed and fluid directional channel of the present invention. It comprises a rectangular sheet of metal 20, having four sides, that, when completely folded to provide the inventive combination, will result in one of the embodiments of the invention as illustrated in any one of the embodiments illustrated in FIGS. 8-15. While described as a rectangular sheet of metal for purposes of easy description, the metal sheet 20 may assume the form of another quadrilateral, for example, a square, parallelogram or trapezoid, with the understating that the method and dimensions of the fold lines and angles described below may need to be adjusted to achieve the goals of the present invention.

Referring again to FIG. 1, the rectangular sheet of metal 20 comprises four side edges, a distal longitudinal edge 62 a proximal longitudinal edge 64 and two lateral edges 22, 60. Points A, B, C, D, E, F, G, H, I, and J are measured along the distal longitudinal edge 62 and together with corresponding points on the proximal longitudinal edge 64 form discreet broken line segments along the proximal longitudinal edge 64, as shown by the intersection of the distal longitudinal edge 62 with the broken score lines 24, 28, 32, 36, 46, 50, 54, and 58 extending from the distal longitudinal edge 62 to the proximal longitudinal edge 64. Points A', B', C', D', E', F', G', H', I', and J', different in distance form any adjacent points, as will be explained, are measured along the proximal longitudinal edge 64 and form discreet line segments along that edge. Each of the broken score lines 24, 28, 32, 36, 46, 50, 54, and 58 extend from the distal longitudinal edge 62 to the proximal longitudinal edge 64 between two corresponding points, e.g., A and A'.

The rectangular sheet of metal 20 is marked by a series of broken score lines according to the invention: the lines between points A-A' adjacent the outer edge 22, BB' indicates a first outer edge bend 24, CC' indicates heat source bed inner wall bend 28, DD' indicates a first raised separation wall between heat source bend and fluid removal channel bend 32, EE' is one boundary of the inclined fluid removal as channel bend 36, FF' indicates the second boundary of the inclined fluid removal as channel bend 46, GG' indicates the second raised separation wall between heat source bend and fluid removal channel as bend 50, HH' heat source bed inner wall bend 54, II' indicates the second outer edge bend 58 adjacent the outer edge 60 and, JJ' is the second outer edge 60.

The plural broken lines shown in FIG. 1 correspond to the fold lines of the method used to separate the different sections of the inventive combination fluid removal channel and heat source beds. For example, the heat source bed first outer retaining wall 26 will be shown below to be formed as a surface 26 (FIG. 1) and will be defined by the broken lines AA' of the outer edge 22 and the BB' of the first outer edge bend 24. The heat source bed first outer retaining wall 26 is adjacent to the heat source bed surface 30, as defined by the broken lines BB' of the first outer edge bend 24 and the broken lines CC' of the heat source first bed inner wall bend 28.

The heat source bed surface 30 is adjacent to the raised separation fluid removal channel surface 40. After completion of the bending operations, the fluid removal channel will comprise the surfaces 34, 38, 40, 44 and 48 that are all raised above the heat source bed surfaces 30 and 52. The surfaces 34 and 48 will comprise the upstanding, and essentially vertical, walls (see FIGS. 8 and 10), rendering the surfaces 30 and 52 as the lowest most surfaces of the combined invention.

The fluid removal channel 40 is defined between heat source bed surfaces 30 and 52, and comprises the fluid removal channel wall 34 bounded by the broken line CC' (the heat source bed inner wall bend 28) and the broken line DD' (the fluid removal channel bend 32). The raised separation between heat source bed 30 and fluid removal channel 34 is adjacent to the sloped channel side surface 38, which defined by broken line DD' fluid removal channel bend 32 and broken line EE', which indicates inclined fluid removal channel bend 36. The sloped channel side surface 38 is adjacent to the inclined fluid removal channel surface 40 defined by broken line EE', indicating a first inclined fluid removal channel bend 36, and broken line FF', indicating a second inclined fluid removal channel bend 46. A drainage hole 42 is located at one longitudinal end of the inclined fluid removal channel surface 40, preferably near the end of the channel surface 40 closest to the proximal longitudinal edge 64, as shown.

The inclined fluid removal channel surface 40 is adjacent to the sloped channel side surface 44 defined by broken line FF', indicating the second inclined fluid removal channel bend 46 and broken line GG' indicating a second raised separation between heat source bend and fluid removal channel bend 50. It should be noted that, except for a slight optional modification discussed in detail below, the bends 46, 50, 54, and 58 essentially mirror the corresponding bends 36, 32, 28, and 24, described above. The sloped channel side surface 44 is adjacent to the raised separation wall surface 48 disposed between heat source bed surface 52 and fluid removal channel surface 48, defined by broken line GG', indicating the second raised separation heat source bend and fluid removal channel bend 50 and broken line HH', indicating the heat source bed second inner wall bend 54. The raised separation wall surface 48 between the heat source bed surface 52 and fluid removal channel surface 40 is adjacent to the heat source bed surface 52 defined by the broken line HH' heat source bed inner wall bend 54 and broken line II' indicating the second outer edge bend 58. The heat source bed surface 52 is adjacent to the heat source retaining wall surface 56 defined by broken line II', indicating the second outer edge bend 58 and broken line JJ' indicating the outer edge 60.

Referring now to FIGS. 2-5, the method steps of the process for making the inventive barbecue grill combination heat source bed and fluid removal channel 20 are illustrated and described. FIG. 2 is a cross sectional view after the EE' inclined fluid removal channel bend 36 has been made. The means for mounting 66 are visible on the AA' outer edge 22 and the JJ' outer edge 60.

FIG. 3 is a cross sectional view taken approximately along a line close to the proximal longitudinal edge 64. It should be understood that the fold lines are somewhat skewed relative to side edges 22, 60, as shown in FIG. 1. The same bends, if the cross-section had been taken further toward the distal edge 62, would appear differently in cross-section; for example, bend 36 would be further toward the left from the centerline CL as shown in FIGS. 2 through 5. The differences in the disposition of the folds when taken at different longitudinal positions of the metal sheet 20 are significant and important, as will be explained with respect to the cross-sectional views (FIGS. 8 and 10) of the finished device shown in FIG. 9, below.

The point in the process shown in FIG. 3 is after the inclined fluid removal channel bend 36 and raised separation between heat source bend and fluid removal channel bend 32 has been completed. The sloped channel side surface 38 has been formed on one side of the sheet metal blank 20 shown in FIG. 1. It should be noted that before manufacture of the inventive combination commences, two flanged mounting brackets 66 are first formed on the two outer edges 22 and 60.

FIG. 4 is a cross sectional view after the inclined fluid removal channel bend 36, the inclined fluid removal channel bend 46, the raised separation between heat source bend and fluid removal channel bend 32, the heat source bed inner wall bend 28, and the raised separation between heat source bend and fluid removal channel bend 50 have been completed, in the sequence set forth above. The inclined fluid removal channel surface 40 is disposed between and adjacent to both the first and second sloped channel side surfaces 38, 44. The sloped channel side surface 38 is disposed on the other side of and adjacent to the raised separation wall between heat source bed surface 30 and fluid removal channel 34. The mounts 66 are visible and disposed on the outer edges 22 and 60.

FIG. 5 is a cross sectional view after the following bends have been made: the inclined fluid removal channel bend 36, the inclined fluid removal channel bend 46, the raised separation wall between heat source bend and fluid removal channel bend 32, the heat source bed inner wall bend 28, the raised separation between heat source bend and fluid removal channel bend 50, the heat source bed inner wall bend 54, and the outer edge bend 24, in that sequence. The inclined fluid removal channel 40 is disposed between and adjacent to both the sloped channel side 38 and sloped channel side 44. The sloped channel side surface 38 is adjacent to the raised separation wall between heat source bed and fluid removal channel 34. The raised separation wall between heat source bed and fluid removal channel 34 is adjacent to the heat source bed 30. The heat source bed 30 is adjacent to the heat source retaining wall 26. The sloped channel side 44 is adjacent to the raised separation between heat source bed and fluid removal channel 48.

Figure 6:
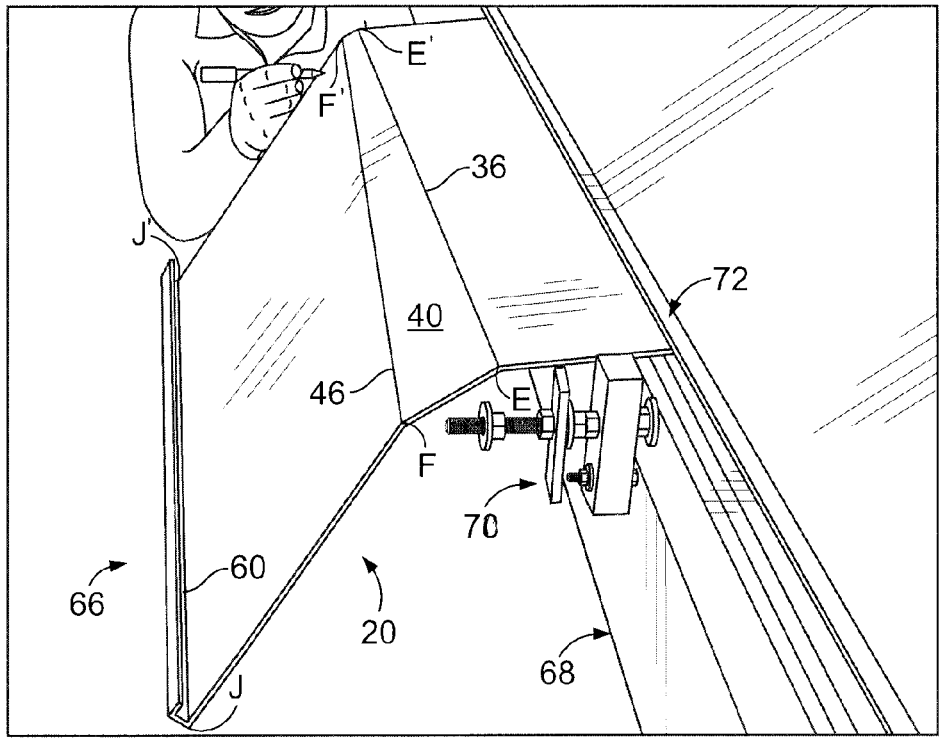
FIG. 6 is a perspective view of the folding method used to make non-right angle bends according to the inventive method.
Figure 7:
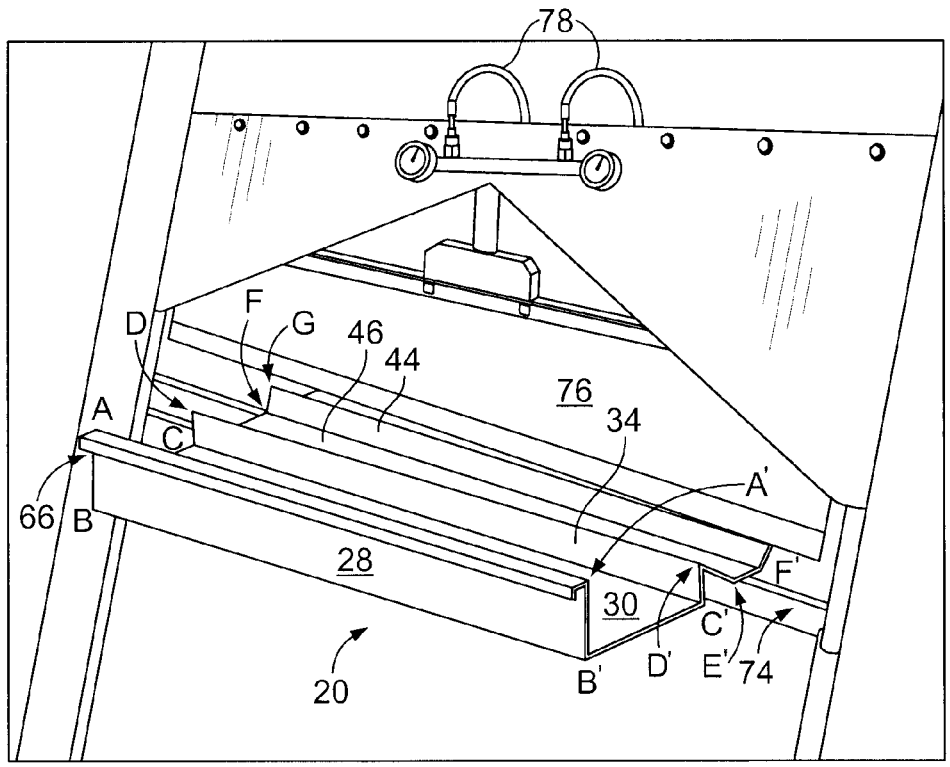
FIG. 7 is a perspective view of the folding method used to make right angle bends according to the inventive method.

FIGS. 6 and 7 are perspective views of the machinery which is utilized to provide the various bends in the process of making the combined device 20 (FIGS. 8-10), as will be explained in more detail below with respect to the process steps of the invention.

Figure 11:
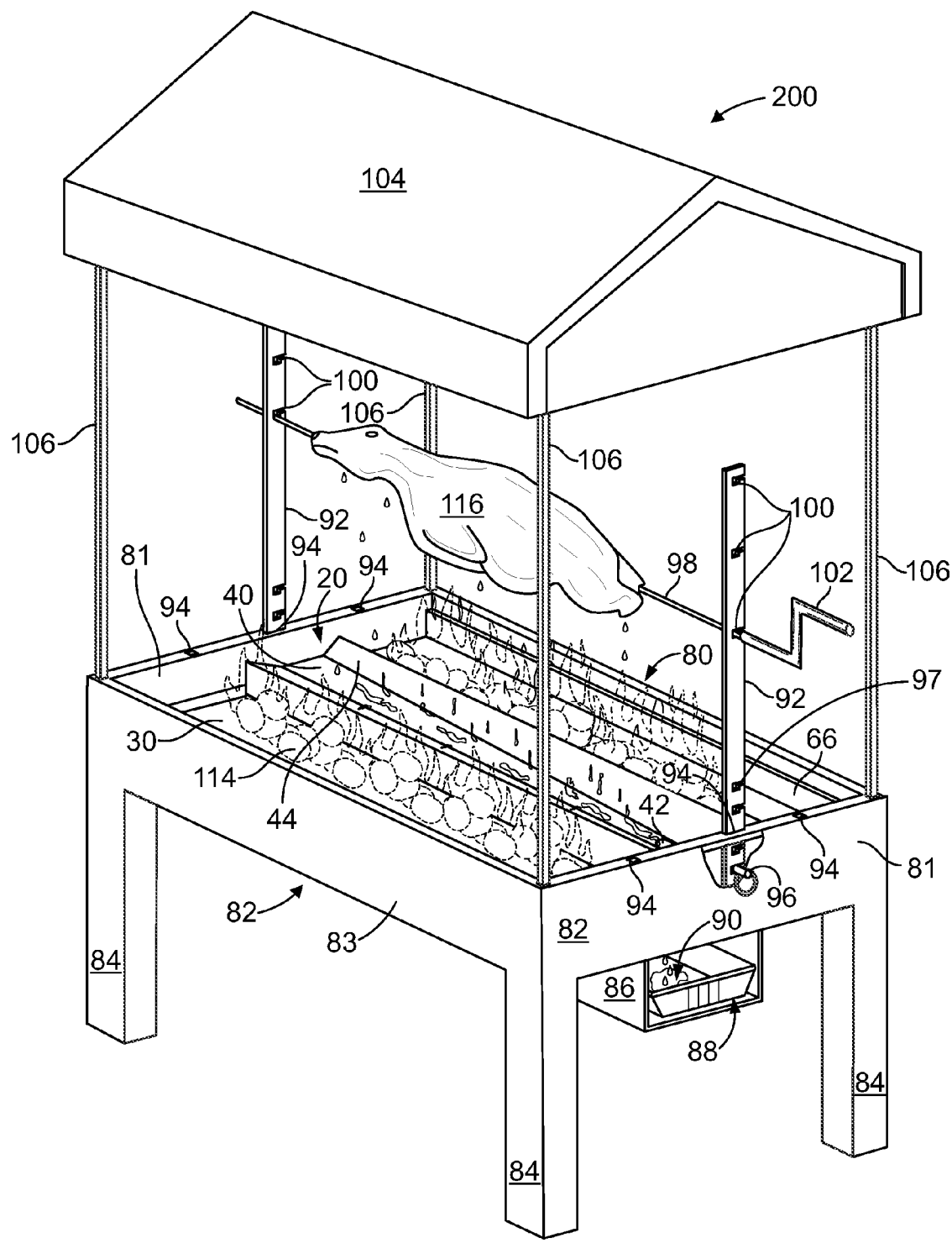
FIG. 11 is a perspective view of an essentially complete whole animal rotisserie assembly shown in an exaggerated rendition of one embodiment of the invention.

FIGS. 8-10 illustrate the finished device after the bends have all been completed and the combined device 20 is ready to be assembled in the final assembled grill product, as shown in FIG. 11. The different angled views of the device 20 are shown in the adjacent positions one above the other. FIG. 9 is a plan view of the metal sheet 20 after it has been worked on and all the bends have been completed.

FIG. 8 shows in cross-section taken approximately along the line 8-8 the distal end of the device 20 immediately adjacent the distal end 62 shown in the plan view of FIG. 9. Similarly, FIG. 10 shows the proximal end in cross section taken approximately along the line 10-10 immediately at the proximal end 64 disposed at the bottom of the device 20 shown in FIG. 9. As positioned on the drawing sheet, the different views essentially line up so that the distinct surfaces and fold lines line up in the views as seen at the two ends.

Referring now particularly to FIG. 8, a cross sectional view taken approximately along the line 8-8 of FIG. 9 as seen adjacent the distal longitudinal edge 62 of the device 20 is shown. Bends, including outer edge bend 24, heat source bed inner wall bend 28, raised separation between heat source bend and fluid removal channel bend 32, inclined fluid removal channel bend 36, inclined fluid removal channel bend 46, raised separation between heat source bend and fluid removal channel bend 50, heat source bed inner wall bend 54, and outer edge bend 58 have been completed. The mount 66 on the outer edge 22 is adjacent to the heat source retaining wall 26. The heat source retaining wall 26 is adjacent to the heat source bed 30. The heat source bed 30 is adjacent to the raised separation between heat source bed and fluid removal channel 34. The raised separation between heat source bed and fluid removal channel 34 is adjacent to the sloped channel side 38. The sloped channel side 38 is adjacent to the inclined fluid removal channel 40. The inclined fluid removal channel 40 is adjacent to the sloped channel side 44. The sloped channel side 44 is adjacent to the raised separation between heat source bed and fluid removal channel 48. The raised separation between heat source bed and fluid removal channel 48 is adjacent to the heat source bed 52. The heat source bed 52 is adjacent to the heat source retaining wall 56. The heat source retaining wall 56 is adjacent to the means for mounting 66 on the outer edge 60.

As seen in FIG. 8, the inclined fluid removal channel 40 is at its highest elevation, relative to the fluid beds 30 and 52, at the distal longitudinal edge 62. As shown, the folds are at the starting points along the distal longitudinal edge 62 shown in FIG. 1. That is, bend 22 is at point A, bend 24 is at point B, bend 28 is at point C, bend 32 is at point D, bend 36 is at point E, bend 46 is at point F, bend 50 is at point G, bend 54 is at point H, bend 58 is at point I, and bend 60 is at point J.

FIG. 9 is the plan view of the fully folded device according to the invention. Some of the points are not visible in FIG. 9 because the folds are viewed from above; for example, points B, C, H, I are not visible) in FIG. 9. As shown in FIG. 1, the points are measured along the distal longitudinal edge 62 and form discreet line segments between adjacent points, for example, line segment A-B, or corresponding on the proximal edge, line segment A'-B'. Points B' (not visible), C' (not visible), D', E', F', G', H' (not visible), I' (not visible), and J' are measured along the proximal longitudinal edge 64 before the metal sheet 20 is bent so that they form discreet line segments between adjacent points. After they are bent, all the fold lines are at points in the folded over ends are different when viewed at the distal edge 62 (FIG. 8) than at the proximal edge 64 (FIG. 10) since the fold lines, e.g., broken lines 32, 36, 46 and 50 are not parallel to the longitudinal edges 22, 60, and end up at different points after folding. That is, for those broken lines in FIG. 1 that indicate where the fold lines are to be made (32, 36, 46, and 50), the line segments of the corresponding points will have different lengths.

Bends along the broken line BB' (FIG. 1) outer edge bend 24 (not visible in FIG. 9), CC' heat source bed inner wall bend 28 (not visible), DD' raised separation between heat source bend and fluid removal channel bend 32, EE' inclined fluid removal channel bend 36, FF' inclined fluid removal channel bend 46, GG' raised separation between heat source bend and fluid removal channel bend 50, HH' heat source bed inner wall bend 54 (not visible in FIG. 9), II' outer edge bend 58 have been made (not visible in FIG. 9). The means for mounting 66 on the AA' outer edge 22 is adjacent to the heat source retaining wall 26 (not visible in FIG. 9).

For example, the heat source retaining wall 26 (not visible in FIG. 9), is adjacent to the heat source bed 30, and separates the heat source bed 30 from the fluid removal channel 34. The raised separation wall between heat source bed and fluid removal channel 34 (not visible in FIG. 9) is adjacent to the sloped channel side 38. The sloped channel side 38 is adjacent and connects to the inclined fluid removal channel 40 after the bend.

A drainage hole 42 is disposed on the inclined fluid removal channel 40 near the distal end of the channel closest to the proximal longitudinal edge 64. The inclined fluid removal channel 40 converges to a narrow slot adjacent this edge 64 and its width is preferably slightly larger than the diameter of the drainage hole, which is preferably round. The inclined fluid removal channel 40 is widest at the distal longitudinal edge 62 and narrowest at the proximal longitudinal edge 64.

The fluid removal channel 40 is adjacent to the sloped channel side 44. The sloped channel side 44 is adjacent to the raised separation between heat source bed and fluid removal channel 48 (not visible in FIG. 9). The raised separation between heat source bed and fluid removal channel 48 (not visible in FIG. 9) is adjacent to the heat source bed 52. The heat source bed 52 is adjacent to the heat source retaining wall 56 (not visible in FIG. 9). The heat source retaining wall 56 (not visible in FIG. 9) is adjacent to the mount 66 on the outer edge 60.

FIG. 10 is a cross-sectional view taken approximately along the longitudinal direction towards the proximal longitudinal edge 64 of the device. The bends along outer edge bend 24, heat source bed inner wall bend 28, raised separation between heat source bend and fluid removal channel bend 32, inclined fluid removal channel bend 36, inclined fluid removal channel bend 46, raised separation between heat source bend and fluid removal channel bend 50, heat source bed inner wall bend 54, II' outer edge bend 58 have been made. The mount 66 on the outer edge 22 is adjacent to the heat source retaining wall 26. The heat source retaining wall 26 is adjacent to the heat source bed 30. The heat source bed 30 is adjacent to the raised separation between heat source bed and fluid removal channel 34. The raised separation between heat source bed and fluid removal channel 34 is adjacent to the sloped channel side 38. The sloped channel side 38 is adjacent to the inclined fluid removal channel 40. The inclined fluid removal channel 40 is adjacent to the sloped channel side 44. The sloped channel side 44 is adjacent to the raised separation between heat source bed and fluid removal channel 48. The raised separation between heat source bed and fluid removal channel 48 is adjacent to the heat source bed 52. The heat source bed 52 is adjacent to the heat source retaining wall 56. The heat source retaining wall 56 is adjacent to the means for mounting 66 on the outer edge 60. As a result of the precise disposition of the bends, the inclined fluid removal channel 40 is at its lowest elevation at the proximal longitudinal edge 64 when the device is laid flat for operation.

FIG. 6 is a perspective view of device being bent using a bending apparatus 68. The rectangular sheet of metal 20, currently bent at the inclined fluid removal channel bend 36 between points EE' and the inclined fluid removal channel bend 46 between points FF' is being measured and marked by the worker for the next bends. The bending apparatus 68 has a clamp 70 that is adjusted to fix the maximum bend angle of the bending apparatus 68. The bending apparatus edge 72 is holding the previously bent rectangular sheet of metal 20 in place for the next bend. The bend is made by lifting the bending apparatus 68 to the maximum angle fixed by the bending apparatus clamp 70 and the rectangular sheet of metal 20 bending around the pivot of the bending apparatus edge 72.

FIG. 7 is a perspective view of the device 20 being bent using a second hydraulic bending apparatus 74 for making right angle bends. The previously bent rectangular sheet of metal 20 is situated in the hydraulic bending apparatus 74 for the desired bend at the points requiring right angle bends, for example, bend 24 between points B-B' or bend 28 between points C-C'. The operator has hydraulic fluid pumped through the hydraulic fluid tubes 78 to lower the hydraulic bending press 76 and thereby to push the sheet of metal 20 into the hydraulic bending apparatus 74 for making the right angle bend. The hydraulic bending apparatus 74 is particularly useful in making these right angle bends.

The method of producing the unitary combination barbecue heat source bed and fluid removal channel requires that points A, B, C, D, E, F, G, H, I, and J are measured along the distal longitudinal edge 62. Points A', B', C', D', E', F', G', H', I', and J' are measured along the proximal longitudinal edge 64. It should be noted that the points marked are precisely positioned at different distances along the edges 62, 64 than are the corresponding points on the other edge. Thus the line segments between the points may have different values when measured at one end 62 than the other end 64. For example, the line segment D-E along edge 62 is much smaller than the line segment D'-E' taken along edge 64.

The sequence of steps in making the bends should be made in the following order: inclined fluid removal channel bend 36, flip rectangular sheet of metal 20 over, make raised separation between heat source bend and fluid removal channel bend 32, flip the rectangular sheet of metal 20 over again and bend heat source bed inner wall bend 28. The rectangular sheet of metal 20 should be rotated 180 degrees and the bends should be made in the following order: inclined fluid removal channel bend 46, the rectangular sheet of metal 20 should be flipped over, raised separation between heat source bend and fluid removal channel bend 50, and the rectangular sheet of metal 20 should be flipped over again, and the heat source bed inner wall bend 54 should be made. The bends are made by adjusting the bending apparatus clamp 70 for the appropriate angle, inserting the rectangular sheet of metal 20 into the jig, lowering and fixing the bending apparatus edge 72, and lifting the bending apparatus 68 to make each bend. The outer edge bend 24 and outer edge bend 58 are made either by the preceding method or the following one. The rectangular sheet of metal 20 is placed on the right angle hydraulic bending apparatus 74. The bend line is aligned with the bending apparatus edge 72. The hydraulic bending press 76 is lowered and presses into the rectangular sheet of metal 20 creating the right angle bends 24, 28, 54 and 58.

FIG. 11 shows a perspective, partially cut-away view of one embodiment of the invention included in a customer assembly of the final product, a whole animal rotisserie 200, according to the invention. The fully folded rectangular sheet of metal 20 with all the elements, folds and bends described above are installed as the inventive unitary combination barbecue heat source bed and fluid removal channel 80. The unitary combination barbecue heat source bed and fluid removal channel 80 is mounted within a rectangular support structure 82, which can be in the general shape of a table absent a table top surface, and in which the combination 80 fits. The inventive rectangular support structure 82 is supported above the ground by legs 84 and includes opposed longitudinal walls 83 and transverse walls 81 extending at an upper end and between the legs 84, as shown, and the structure 82. The mounts 66 (FIGS. 8-10) at either edge of the inventive combination device 80 are shown to extend over and accommodate the upper ends of the side surfaces of the support structure 82 of the rotisserie 200.

The rotisserie 200 includes removable fluid receptacle retainer 86 disposed beneath the inventive unitary combination barbecue heat source bed and fluid removal channel 80 towards the proximal longitudinal edge 64 and positioned directly underneath the drainage hole 42. The removable fluid receptacle retainer 86 accommodates a removable fluid receptacle 88, which can comprise a disposable aluminum pan or the like. Grease drippings and fluids 90 are directed by gravity down the inclined fluid removal channel 40 and fall through the drainage hole 42 into the removable fluid receptacle 88.

Posts 92 are disposed at either end of the rotisserie 200 for purposes of retaining and supporting a spit 98 between the posts 92 and above the inventive unitary combination 80. Support structure 82 supports the two posts 92 by post holes 94 disposed in the upper surfaces of transverse walls 81 of rectangular support structure 82. The posts 92 are held in place by the post locking pins 96 shown in partial cutaway on the proximal wall 81 and extending therethrough, allowing the height of the posts 92 to be adjusted. The adjustment of posts 92 in this embodiment preferably comprise a pinhole (not shown in the cutaway view) into which the pin 96 is inserted, and then further inserted into one of a sequence of receiving pinholes 97 arrayed along the longitudinal direction at the lower end of the posts 92. Of course, enough leeway must be provided in the vertical direction within wall 81 so that the lower end of the post 92 can be adjusted vertically within the walls 81. Withdrawal of the pin 96 from the receiving pinholes 97 will permit the post 92 to slide vertically within the holes 94 to a position of the spit 98 that is desired. The two side holes 94 are shown with smaller dimensions and can be used for smaller spits (not shown), for example, for supporting kabobs or smaller pieces of meat, or perhaps poultry (not shown).

The rotisserie spit 98 is supported between the posts 92 at predetermined positions defined by cut-outs 100 in the sides of posts 92. The cut-outs 100 include notches that extend to the edge of the post sides so that the spit 98 can be inserted into the cut-outs where desired relative to the heat source 114 in the heat source bed to provide the desired temperature to the cooking meat. It should be noted that the separations between the cut-outs 100 and the receiving pinholes 97 are different, so that the gross adjustments in the vertical position of the spit 98 can be made by changing the position of the spit 98 in the cut-outs 100 while finer adjustments can be made by raising and lowering the posts 92 by placing the pin 96 in lower or higher receiving pinholes 97.

Figure 12:
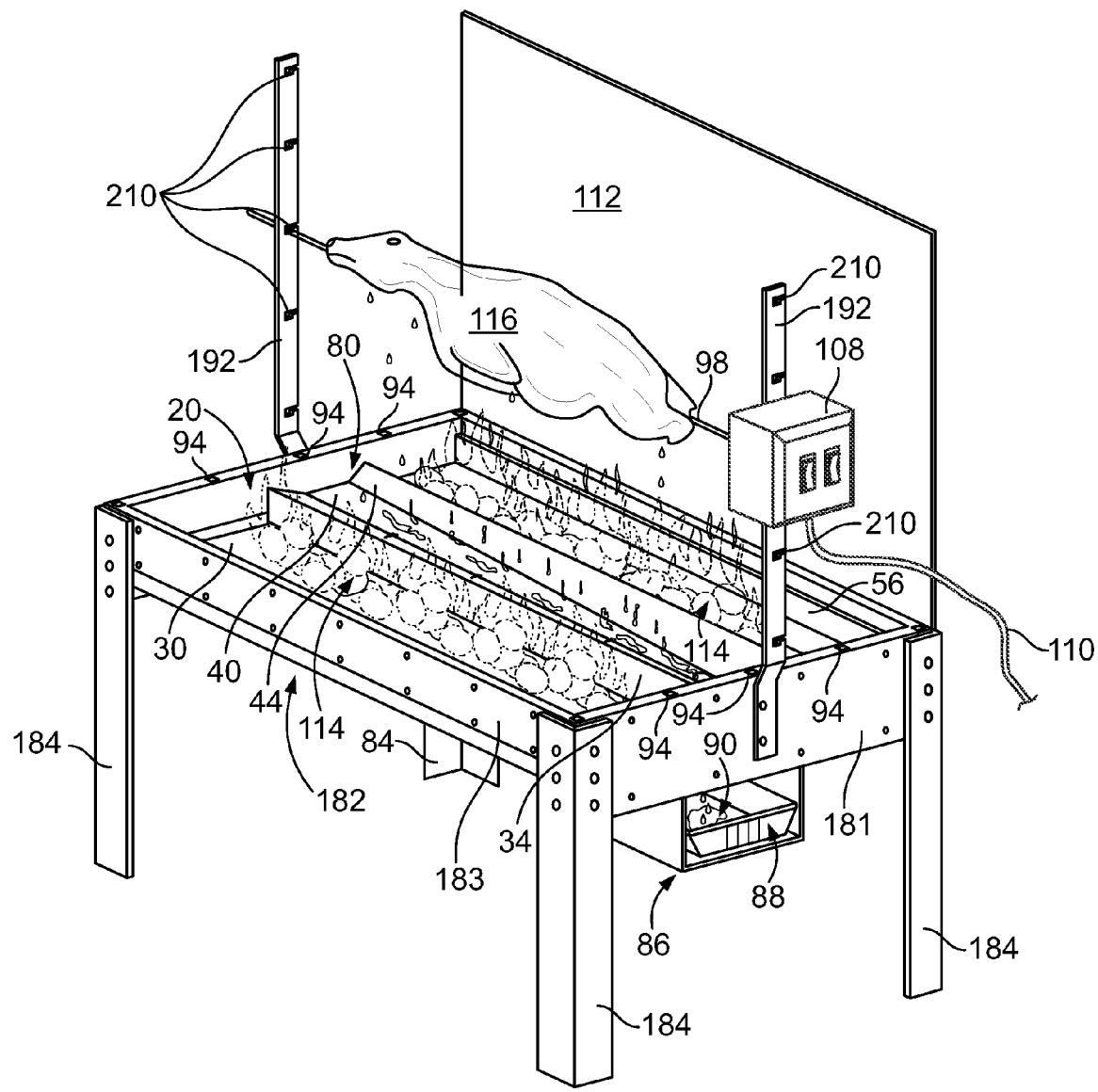
FIG. 12 is a perspective view of an essentially complete whole animal rotisserie assembly shown in exaggerated rendition of a second embodiment of the invention.

The hand crank 102 is attached to the end of the rotisserie spit 98 to enable manual rotation of the rotisserie spit 98. While in this embodiment the spit 98 is shown ready for rotating by manual operation of the hand crank 102, it should be understood that a motorized rotation can also be used herein, as is shown in FIG. 12 and described below. Optional accessories, such as the roof 104 mounted on the roof supports 106 which are connected to the rectangular support structure 82 can be used to protect the roasting meat 116 from the elements. The roof 104 is to keep rain and debris from falling on the unitary combination barbecue heat source bed and fluid removal channel 80, and also to retain the radiant heat emanating from the heat source fuel 114. Fuel 114, for example charcoal, is provided in the heat source beds 30, 52 providing radiant heat to the meat or whole animal carcass 116.

FIG. 12 shows a perspective view of a second embodiment of the invention as part of a whole animal rotisserie 116 according to the invention. The fully folded rectangular sheet of metal 20 with all the elements described herein with reference to FIGS. 8-10 provide for the essentially identical inventive unitary combination barbecue heat source bed and fluid removal channel 80 disposed and assembled within a support structure 182. The unitary combination barbecue heat source bed and fluid removal channel 80 is attached to the rectangular support structure 182, which forms the support structure for the rotisserie barbecue grill embodiment 300.

The rectangular support structure 182 is supported above the ground by legs 184 but slightly differently from that of the embodiment of FIG. 11. That is, while the legs 84 (FIG. 11) are shown integral with the walls 81, 83, this embodiment includes separate legs 184 that are attached to the corners where the walls 181 and 183 are connected to each other. A removable fluid receptacle holder 86 is also preferably attached beneath the unitary combination barbecue heat source bed and fluid removal channel 80 towards the proximal longitudinal edge 64 (not visible in FIG. 12) and directly underneath drainage hole 42. The removable fluid receptacle 86 holder accommodates and supports a removable fluid receptacle 88. Grease drippings and fluids 90 flow down the inclined fluid removal channel 40 and fall through the drainage hole 42 (not visible) into the removable fluid receptacle 88.

The posts 192 are not placed through the post holes 94 of the rectangular support structure 82, as in the FIG. 11 embodiment, but are attached by an appropriate connector such as screws or rivets. The rotisserie spit 98 is supported by the posts 192 by insertion on either post 192 in the cut-outs 210 at a desired height from the heat source beds 30, 52. The rotisserie spit holes 210 allow the height of the rotisserie spit 98 to be adjusted to an appropriate distance from the coals 114 so that the meat 116 on the spit 98 does not singe or cook too fast.

Unlike the hand crank 102 of the FIG. 11 embodiment 200, an electrically driven motor 108 is disposed at the proximal end of the rotisserie spit 98 and causes it to rotate at a desired speed. The motor 108 may be mounted through the rotisserie spit holes 210 and power for the operation of the motor may be available through motor power cable 110 connected to an electrical source such as a battery cell or an electrical outlet. Additional accessories, such as the wind block 112 mounted between the roof and the rectangular support structure 82, may be provided to block wind during device use. Fuel 114 is in the heat source beds 30, 52 and provides radiant heat to the meat or whole animal carcass 116. It is a known phenomenon that a continual wind directed toward the cooking meat significantly increases cooking time, so that wind block 112 reduces this effect.

FIG. 13 is a cross sectional view taken approximately along the lateral direction at the distal end of an alternative embodiment of the finished combination device 120. However, as shown, the bends are differently configured but nevertheless incorporate the necessary and desirable features of the invention. Since the view in FIG. 13 corresponds somewhat to the view of the device 20 shown in FIG. 9, and for ease of description, this embodiment of the device 120 will be compared to that of the cross-section taken approximately at the same location of the device 20 as shown in FIG. 10.

There are no differences between the bends made along outer edge bends 122, 124, and 158, 160. However, as seen clearly in FIG. 13, heat source bed inner wall bends 128, 154 defining the raised separation between heat source bend and fluid removal channel bends 132, 150 are not at right angles but instead are at the same oblique angle relative to the respective fuel bed surfaces 130, 152, albeit oriented in opposite directions. The remaining bends, e.g., the inclined fluid removal channel bends 136, 146, the raised separation between heat source bend and fluid removal channel bends 132, 150, and the inner inclined fluid removal channel bends 136, 146, will need to be made to accommodate the changes in lengths between the bends, with differences in the discrete lengths between the bends being offset with the changes made to the angles. One possible accommodation may require that the raised separation between heat source bed and fluid removal channel bends 132, 150 are not perpendicular to the distal and proximal edges 262, 264, respectively, but will be slightly skewed form perpendicular. The inclined fluid removal channel 140 is at its highest elevation at the distal longitudinal edge 62, where the cross-section is approximately taken.

FIG. 14 is a cross-sectional view taken approximately along the lateral direction at a proximal end of still another embodiment of a finished combination device 220. However, as shown, the bends are differently configured from both the FIG. 8-10 and FIG. 13 embodiments, but nevertheless incorporate the necessary and desirable features of the invention. FIG. 14 is a cross-sectional plan view of the device as shown in FIG. 15, taken approximately along the section line 14-14 towards the proximal longitudinal edge of a different embodiment of the invention. Since these two views in FIGS. 14 and 15 correspond somewhat to those of the device 20 shown in FIGS. 9 and 10, respectively, and for ease of description, this embodiment of the device 220 will be compared to that of the cross-section taken approximately at the same location of the device 20 as shown in FIG. 10. The inclined fluid removal channel 240 is at its lowest elevation at the proximal longitudinal edge 264, where the cross-section is approximately taken.

There are no differences between the bends made along outer edge bends 222, 224, and 258, 260. However, as seen most clearly in FIG. 14, heat source bed inner wall bends 228, 254 defining the raised separation between heat source bend and fluid removal channel bends 232, 250 are not at right angles but instead are at the same acute angle relative to the respective fuel bed surfaces 230, 252, albeit oriented in opposite directions. The remaining bends, e.g., the inclined fluid removal channel bends 236, 246, the raised separation between heat source bend and fluid removal channel bends 232, 250, and the inner inclined fluid removal channel bends 236, 246, will need to be made to accommodate the changes in lengths between the bends, with differences in the discrete lengths between the bends being offset with the changes made to the angles. One possible accommodation may require that the raised separation between heat source bed and fluid removal channel bends 232, 250 are not perpendicular to the distal and proximal edges 262, 264, respectively, but will be slightly skewed, as shown in FIG. 15.

The invention can also be characterized by the following specified mathematical relationships. As described above, FIG. 1 shows a longitudinal view of a rectangular sheet of metal 20 which is the starting point of the bending process that results in the inventive combination. The rectangular sheet of metal 20 has a distal longitudinal edge 62 and a proximal longitudinal edge 64. Points A, B, C, D, E, F, G, H, I, and J are measured along the distal longitudinal edge 62 and form discreet line segments, for example AB, CD, etc. Points A', B', C', D', E', F', G', H', I', and J' are measured along the proximal longitudinal edge 64 and form discreet line segments, for example A'B', C'D', etc. For both proximal and distal edges 62, 64 of the sheet 20, the sum of the discrete segments are equal, since by definition the length of segment AJ of the edge 62=the length of segment A'J' of edge 64.

In the embodiment 20 shown in FIGS. 1 and 8-10, the lengths of segments AB=A'B' and BC=B'C' because even after the bends in the bending steps described above in reference to FIGS. 2-7, the bend lines 24, 28 and 54, 58 are all parallel to the longitudinal edges 22, 60 of the rectangular sheet 20. However, and because of the either converging or diverging nature of the bend lines 32, 36, 46 and 50 relative to the longitudinal edges 22, 60, the line segments CD, DE, EF, FG and GH do not equal the respective corresponding segments C'D', D'E', E'F', F'G' and G'H'. However, removing the segments that are equal to the corresponding ones on the other edge, the relationship of the remaining segments must add up to the same total length. That is, the length of segments CD+DE+EF+FG+GH=C'D'+D'E'+E'F'+F'G'+G'H'. Additionally, in order to obtain the desired slope in the channel surface 40 and, as compared in FIG. 1 and in FIGS. 8, 10, the discrete segments, should have the following relationships: AB=A'B'; BC=B'C'; CD≥C'D'; DE≤D'E'; EF>E'F'; FG≤F'G'; GH≥G'H'; HI=H'I'; IJ=I'J'.

Similarly, and because of the differences in the fold lines in the embodiments 120, 220 shown in FIGS. 13-15 that may be necessitated by the configuration thereof, the relationships of the segments may differ from that shown in respect to the embodiment 20 of FIG. 1 will also differ. For example, and using the two views of the embodiment 220 illustrated in FIGS. 14 and 15, bend lines 232, 250 are not parallel to the respective edges 266. Thus, the additional line segments must included in the final equations, that is, for the embodiments of FIGS. 113-15, the relationships are: BC+CD+DE+EF+FG+GH=B'C'+C'D'+D'E'+E'F'+F'G'+G'H', and AB=A'B'; BC=B'C'; CD≥C'D'; DE≤D'E'; EF>E'F'; FG≤F'G'; GH≥G'H'; HI=H'I'; IJ=I'J'.

One specific embodiment of the invention 20 has been made with the following preferred dimensions shown in FIG. 1. The center of the inclined fluid removal channel 40 at the distal longitudinal edge 62 having a width of 4 inches, the sloped channel sides 38, 44 having a width of 2¼ inches, the raised separation between heat source bed and fluid removal channel 34, 48 having a width of 2½ inches. The center of the inclined channel at the proximal longitudinal edge 64 having a width of 1¼ inches, the sloped channel sides 38, 44 having a width of 2⅞ inches, the raised separation between heat source bed and fluid removal channel 34, 48 having a width of 2¼ inches. Two heat source beds 30, 52 adjacent to the incline fluid removal channel 40 had a width of 16¼ inches. The angle between the center of the inclined fluid removal channel surface 40 and the sloped channel sides 38, 44 being about 145 degrees for the entire length of the channel surface 40. The angle between the sloped channel sides 38, 44 and the raised separation between heat source bed and fluid removal channel 34, 48 being about 50 degrees for the entire length of the inclined fluid removal channel surface 40. The angle between the heat source bed 30, 52 and the raised separation between heat source bed and fluid removal channel 34, 48 being essentially 90 degrees for the entire length of the inclined fluid removal channel surface 40. The angle between the heat source bed 30, 52 and the heat source retaining wall 26, 56 being essentially 90 degrees.

A single cycle of operation is as follows. The unitary combination barbecue heat source bed and fluid removal channel 80 is bent in accordance with the methods described above to obtain one of the inventive embodiments 20, 120 or 220. The inventive unitary combination barbecue heat source bed and fluid removal channel 80 is then assembled into a rotisserie grill as seen in the assembly embodiment of either FIG. 11 or FIG. 12. Fuel 114, usually in the form of charcoal briquettes or wood chips, is placed in heat source beds 30 and 52. The animal carcass is attached to the rotisserie spit 98, by inserting the spit 98 through the meat of the animal. The fuel 114 is ignited in a standard manner. The rotisserie spit 98 is then mounted on the posts 92 or 192, and rotated either by hand crank 102 or motor 108 (plugged into power source via motor power cable 110) respectively. As the animal roasts grease drippings and fluids 90 fall into the inclined fluid removal channel 40. The grease drippings and fluids 90 flow down the inclined fluid removal channel 40 and are directed by gravity to and through the drainage hole 42 and into the removable fluid receptacle 88. When the roasting is completed, the removable fluid receptacle 88 can be removed from the means for holding removable fluid receptacle 86 and the grease drippings and fluids 90 can be disposed of in an appropriate manner. The unitary combination barbecue heat source bed and fluid removal channel 80 can then be hosed off for easy cleaning; the unitary combination barbecue heat source bed and fluid removal channel 80 can also be removed from the rectangular support structure 82 and cleaned or stored separately by removing one or more sides 181, 183 and sliding the bed 180 out of its assembled position.

The foregoing description of a preferred embodiment of the invention has been presented for purposes of illustration and description, and is not intended to be exhaustive or to limit the invention to the precise form disclosed. The description was selected to best explain the principles of the invention and practical application of these principals to enable others skilled in the art to best utilize the invention in various embodiments and various modifications as are suited to the particular use contemplated. It is intended that the scope of the invention not be limited by the specification or drawings, but the invention be defined by the claims set forth below and any equivalents.

What is claimed is:

1. A unitary barbecue heat source bed and fluid removal channel combination, comprising:
   a. a plurality of extending longitudinally heat source beds, each heat source bed having a generally planar support surface capable of retaining fuel thereon; and
   b. an a longitudinally extending inclined channel for removing fluid disposed immediately adjacent the plurality of heat source beds, the inclined channel having at least one contiguous surface that is inclined at an angle relative to the generally planar heat source bed support surface;
   c. wherein the heat source beds are disposed adjacent to and on either side of the inclined channel, said at least one contiguous surface being further defined by sloped channel sides extending upwardly from the contiguous surface thereby providing a raised separation between the inclined channel and each heat source bed; and
   wherein the heat source beds and inclined channel comprise a unitary structure made from a single rectangular sheet of metal having a continuous surface, and
   wherein the inclined channel is widest at a point where the channel is furthest removed from the heat bed support surface and narrowest at a point where the channel is closest to the heat bed support surface.

2. The unitary barbecue heat source bed and fluid removal channel combination of claim 1, wherein the inclined channel is raised above the heat source beds when installed.

3. The unitary barbecue heat source bed and fluid removal channel combination of claim 1, further comprising:
   c. a drainage hole disposed at the lower end of the inclined channel.

4. The unitary barbecue heat source bed and fluid removal channel combination of claim 1, the inclined channel being further defined by at least one upstanding wall, wherein the generally planar support surface of the heat source bed is at a 90 degree angle relative to an the at least one upstanding wall of the inclined channel.

5. The unitary barbecue heat source bed and fluid removal channel combination of claim 1, further comprising:
   d. a mounting mechanism for mounting the combination to a support structure, the mounting mechanism further including bends disposed at opposite lateral ends of the inclined channel, the bends being disposed at the end of the heat source bed furthest from the inclined channel.

6. The unitary barbecue heat source bed and fluid removal channel combination of claim 1, further comprising:
   f. a heat source retaining wall disposed essentially parallel to the inclined channel located on the outer lateral edge of each heat source bed.

7. A unitary barbecue heat source bed and fluid removal channel combination according to claim 1, further comprising defined sections of the combination wherein:
   d. A, B, C, D, E, F, G, H, I, and J being predetermined points defining discreet line segments measured along the distal longitudinal end of the sheet of metal;
   e. A', B', C', D', E', F', G', H', I', and J' being predetermined points defining discreet line segments measured along the proximal longitudinal end of the sheet of metal;
   wherein the line segments are designated as AB, BC, CD, DE, EF, FG, GH, HI, IJ, A'B', B'C', C'D', D'E', E'F', F'G', G'H', H'I', I'J';
   f. a center of the inclined channel (EF-F'E');
   g. the inclined channel being further defined by sloped channel sides (DE-E'D' and FG-G'F');
   h. raised separations between the inclined channel and the heat source bed defined by lines CD-D'C' and GH-H'G'); and
   i. two heat source beds defined by boundary lines BC-C'B' and HI-I'H' adjacent to the inclined channel
   wherein the relative dimensions of the sections are defined as follows:
   AB=A'B'; BC=B'C'; CD≥C'D'; DE≤D'E'; EF>E'F'; FG≤F'G'; GH≥G'H'; HI=H'I'; and IJ=I'J'.

8. The unitary combination barbecue heat source bed and fluid removal channel of claim 7, wherein the length of BC+CD+DE+EF+FG+GH+HI=B'C'+C'D'+D'E'+E'F'+F'G'+G'H'+H'I'.

9. A method for bending a single sheet of metal into a unitary barbecue heat source bed and fluid removal channel combination, comprising:
   a. providing a rectangular sheet of metal;
   b. bending the sheet of metal to form an inclined fluid removal channel medially located approximately along the longitudinal center of the rectangular sheet comprising at least one upstanding wall;
   c. further bending the sheet of metal to form beds for holding fuel immediately adjacent the inclined fluid removal channel, the fluid removal channel having at least one contiguous surface being inclined at a discrete angle relative to the beds, said at least one contiguous surface being further defined by sloped channel sides extending upwardly from the at least one contiguous surface thereby providing a raised separation between the inclined channel and each bed; and
   d. bending a mounting mechanism for holding the unitary combination barbecue heat source bed and fluid removal channel on a supporting structure.

10. The method for bending a single sheet of metal into a unitary barbecue heat source bed and fluid removal channel combination of claim 9, wherein the first bending step further comprises:
measuring and marking the sheet of metal;
positioning the sheet to make the first bend;
bending the first non-perpendicular bend, closest to the center, to form the center of the inclined fluid removal channel;
repositioning and flipping over the metal sheet to make the second bend;
bending the second non-perpendicular bend to form a raised separation between the fluid removal channel and the heat source bed;
repositioning and flipping over the metal sheet to make the third bend;
bending the third non-perpendicular bend, closest to the center, to form the center of the inclined fluid removal channel;
repositioning and flipping over the metal sheet to make the fourth bend;
bending the fourth non-perpendicular bend to form a raised separation between the fluid removal channel and the heat source bed;
repositioning and flipping over the metal sheet to make the fifth bend;
bending the first perpendicular bend to form the heat source bed;
repositioning the metal sheet to make the sixth bend;
bending the second perpendicular bend to form the inner edge of the heat source bed.

11. The method for bending a single sheet of metal into a unitary combination barbecue heat source bed and fluid removal channel of claim 9, wherein measuring and marking the metal further includes providing for perpendicular and non-perpendicular bends and the angle of bends to be measured from the edge of the rectangular sheet of metal,
and wherein bending the sheet metal to form heat source beds is performed with a perpendicular bend parallel to the bend that forms the heat source bed thereby to form a retaining wall for the heat source bed.

12. A unitary barbecue heat source bed and fluid removal channel combination comprising:
a. a plurality of heat source beds; and
b. an inclined channel for removing fluid disposed adjacent the plurality of heat source beds,
c. the heat source beds being adjacent to and disposed on either side of the inclined channel;
wherein the heat source beds and channel comprise a unitary structure made from a single rectangular sheet of metal and further wherein:
d. the center of the inclined channel at the distal longitudinal end has a width of 4 inches, the sloped channel sides has a width of 2¼ inches, the raised separation between the inclined channel and the heat source bed has a width of 2½ inches;
e. the center of the inclined channel at the proximal longitudinal end has a width of 1¼ inches, the sloped channel sides has a width of 2⅞ inches, the raised separation between the inclined channel and the heat source bed has a width of 2¼ inches;
f. two heat source beds adjacent to the inclined channel each have a width of at least 16¼ inches;
g. the sloped channel sides relative to the center of the inclined channel are at an angle of approximately 145 degrees for the entire length of the channel;
h. the sloped channel sides relative to the raised separation between the inclined channel and the heat source bed are at an angle of approximately 50 degrees for the entire length of the channel;
i. the heat source bed is essentially perpendicular relative to the raised separation between the inclined channel and the heat source bed for the entire length of the channel;
j. the heat source bed is essentially perpendicular relative to the heat source retaining wall for the entire length of the channel.

13. A rotisserie grill with a unitary combination barbecue heat source bed and fluid removal channel, comprising:
a. two heat source beds, the heat source beds having a generally planar heat source support surface and being shaped, configured and disposed when in use to retain a heat source therein;
b. an inclined channel for removing fluid, the inclined channel having at least one contiguous surface that is at a discrete angle relative to the heat source support surfaces of at least one of the heat source beds and at least one upstanding wall, said at least one contiguous surface being further defined by sloped channel sides defining walls extending upwardly from the at least one contiguous surface thereby providing a raised separation between the inclined channel surface and each heat source bed;
c. the heat source beds being immediately adjacent the inclined channel;
d. the heat source beds and inclined channel being unitary;
e. the inclined channel being raised above the heat source beds;
f. the inclined channel having a drainage hole disposed at a longitudinal end of the inclined channel that is closest to the heat source support surfaces of at least one of the heat source beds;
g. each heat source bed having essentially a 90 degree angle with the at least one upstanding wall of the inclined channel;
h. a mount to allow for the combination to be attached to a support structure, the mount including bends parallel to the inclined channel at the end of the heat source bed furthest from the inclined channel;
i. a support structure, wherein the mount is connected to the support structure;
j. four legs, one connected at each corner of the support structure;
k. a slot for holding a removable fluid receptacle suspended from the support structure so that fluids draining through the drainage hole drain into the fluid receptacle;
l. a rotisserie spit on which an animal carcass may be mounted; and
n. at least two posts for providing for the capability of mounting the rotisserie spit at one or more predetermined positions at a vertical elevation from the heat source bed and fluid removal channel combination so that radiant heat can be directed from the heat source to the spit.

14. The rotisserie grill with a unitary combination barbecue heat source bed and fluid removal channel of claim 13, further comprising:
o. a driver attached to one end of the rotisserie spit configured, oriented and supported for rotating the rotisserie spit.

15. The rotisserie grill with a unitary combination barbecue heat source bed and fluid removal channel of claim 14, wherein the driver is a hand crank.

16. The rotisserie grill with a unitary combination barbecue heat source bed and fluid removal channel of claim 14, wherein the driver is a motor.

* * * * *